United States Patent [19]

Mitchell

[11] Patent Number: 5,128,802
[45] Date of Patent: Jul. 7, 1992

[54] PATTERNED PLASTIC OPTICAL COMPONENTS

[75] Inventor: Vance C. Mitchell, Irvine, Calif.

[73] Assignee: Hycor Biomedical, Fountain Valley, Calif.

[21] Appl. No.: 727,353

[22] Filed: Jul. 8, 1991

Related U.S. Application Data

[63] Continuation of Ser. No. 520,969, May 9, 1990, abandoned, which is a continuation of Ser. No. 227,131, Aug. 2, 1988, abandoned, which is a continuation-in-part of Ser. No. 148,870, Jan. 27, 1988, abandoned.

[51] Int. Cl.$^5$ .............................................. G02B 21/34
[52] U.S. Cl. ..................................... 359/397; 359/398
[58] Field of Search ............. 219/69 D, 69 E, 121.65; 350/534, 535, 536; 359/396, 397, 398

[56] References Cited

U.S. PATENT DOCUMENTS

| | | | |
|---|---|---|---|
| 1,647,865 | 11/1927 | Hausser | 350/535 |
| 1,824,097 | 9/1931 | Ott | 350/535 |
| 1,918,351 | 7/1933 | Schulze | 350/535 |
| 1,994,483 | 3/1935 | Ott | 350/535 |
| 2,415,480 | 2/1947 | Gassert | 350/535 |
| 3,777,283 | 12/1973 | Elkins | 350/536 |
| 4,455,893 | 6/1984 | Astero | 219/121.65 |
| 4,637,693 | 1/1987 | Mitchell | 350/536 |

FOREIGN PATENT DOCUMENTS 156259 9/1956 Sweden ................................. 350/536

Primary Examiner—Bruce Y. Arnold
Assistant Examiner—Martin Lerner
Attorney, Agent, or Firm—Edward S. Irons

[57] ABSTRACT

A transparent plastic slide for microscopic examination of fluids with at least one grid defined on the floor portion of the slide. The grid consisting of lines rising symmetrically from the floor portion of the slide with a line width of from about 0.05 to 0.005 mm. The lines defining enclosed areas, in which particles suspended in sample fluids can be counted. The sizes of enclosed areas being selected to be within the field of view for microscopic examination.

4 Claims, 2 Drawing Sheets

PATTERNED PLASTIC OPTICAL COMPONENTS

This application is a continuation of Ser. No. 07/520,969 filed May 9, 1990, now abandoned, which is a continuation of Ser. No. 07/227,131 filed Aug. 2, 1988, which is abandoned, and a continuation in part of Ser. No.07/148,870 filed Jan. 27, 1988, also abandoned.

FIELD OF THE INVENTION

This invention relates to plastic optical components having a finely lined pattern on a viewing surface. More specifically, the invention relates to transparent plastic slides having a finely lined pattern to facilitate examination under magnification of a specimen overlying said pattern and to methods and mold inserts for the production of such slides and other pattern bearing optical components.

BACKGROUND OF THE INVENTION

Biological fluids, such as blood, spinal fluid, cell cultures and urine, are frequently examined microscopically to determine the presence or concentration of suspended particulate matter. For many years, a drop of the liquid specimen was first placed on a flat transparent microscope slide. A thin flat transparent cover slip was then placed over the specimen. More recently unitary plastic slides as shown in U.S. Pat. No. 4,637,693 have become available. Such unitary slides include at least one examination chamber formed between integral base and cover plates. A liquid specimen is drawn by capillation into the chamber from a drop placed adjacent thereto.

To accurately determine the concentration of suspended particles or cells in a liquid specimen, several parameters must be either measured or maintained at constant values. These parameters include the interior dimensions which determine the volume of the examination chamber and the volume of fluid from which the sample is taken. In urinalysis procedures the sample is taken at a standard volume of 12 ml. The 12 ml. sample is centrifuged and 11 ml. are decanted. The sediment is resuspended in the remaining 1 ml. to provide a 12 to 1 concentration of the particulate. This procedure is facilitated by use of the pipette described in Mitchell U.S. Pat. No. 4,563,332.

Unitary plastic slides as described in U.S. Pat. No. 4,637,693 have examination chamber roofs spaced a predetermined distance from the chamber floors. With such slides the only remaining dimension required to determine the volume of specimen liquid under examination is the lateral dimension of the field of view of the examining instrument, e.g., a microscope. This lateral dimension varies depending on magnification and the optics used in the instrument. Therefore, standardization requires either that all microscopes or the like have the same field of view or that the differences in fields of view must be calculated and factored into the various counts of suspended particulate matter.

Pursuant to this invention a grid system is defined on the floor of a slide examination chamber, thus eliminating the need to consider the lateral extent of the field of view of the examining instrument. Such a grid system may be provided on the examination chamber floor of a slide which is utilized with a separate cover slip or of unitary slide having a permanently affixed cover plate as shown for example in U.S. Pat. No. 4,637,693.

Such slides are made of transparent optical quality plastic. The grid must either be machined or scribed onto the chamber floor after the slide is molded or formed from a pattern incorporated into the mold. This invention provides molds and molding procedures useful to incorporate a grid pattern into an examination chamber floor during the molding process.

Many applications, e.g., urinalysis procedures, require magnification of the order of 400 times. At this magnification the diameter of the fields of view vary from about 0.33 millimeters (mm) to 0.50 mm. Grid systems with narrow defining lines, e.g., 0.025 mm in width, separated by less than half a millimeter are required. Otherwise, portions of the grid perimeter will extend beyond the field of view requiring adjustments to the microscope or other magnification instrument, thus effectively defeating the purpose of the grid.

Pursuant to this invention fine patterns such as grids are provided on plastic optical components, specifically urinalysis slides, for use at magnification of from about $10\times$ to about $1500\times$. A magnification range of from about $350\times$ to about $450\times$ is appropriate for most purposes. Pattern line widths of from about 0.005 to about 0.05 mm and pattern line spacings of from about 0.06 mm to about 9 mm accommodate such magnification ranges.

DESIGN AND PRODUCTION OF MOLD INSERTS

Prior to this invention efforts to provide fine line widths on metal mold parts for use in the production of plastic optical components such as urinalysis slides have not been successful. For example, minimum line widths of only about 0.076 to 0.13 mm have been achieved using milling or grinding machine techniques.

Pursuant to this invention electrical discharge machining techniques provide marking for a grid system on metal mold inserts useful to make the examination chamber floor surfaces on plastic slide bases and other kinds of plastic optical components. Such plastic slide bases normally have multiple examination chamber floor surfaces. Each floor surface must have an optical quality finish. Hence, the portions of the molds, i.e., the "mold inserts", on which examination floor surfaces are formed must also have an optical quality finish. Conventionally, stainless steel, free of pits and voids, polished to an optical quality or mirror finish is employed. To provide a grid system on examination floor surfaces material must be removed or added to the polished mold surface in an appropriate pattern of lines.

One aspect of this invention provides an electrical discharge machining method for precisely removing material from polished metal mold face surfaces to provide fine line patterns, e.g., patterns with line widths of about 0.012 to about 0.023 mm.

The electrical discharge machining method entails submerging a grounded metal mold insert in a non-conductive fluid adjacent an electrode conforming to a pattern to be eroded into the mold insert. When the electrical potential between the grounded mold insert and electrode reaches the break down potential, an arc is formed with erodes both the surface of the mold insert to be machined and that of the electrode. The depth of the mold insert erosion is a function of the spacing between the insert surface and the electrode and of the applied electrical potential. The width of the lines eroded into the mold surface depends on the width of the corresponding electrode elements and the potential between the mold insert and the electrode. For example, using standard electrical discharge machining equipment with an electrode 0.013 mm thick results in eroded lines having widths between 0.025 to 0.036 mm on the mold insert face.

Thin electrodes are essential to provide the requisite narrow eroded line widths on the mold insert. Such electrodes, as an incident of arcing or for other reasons, may bend thus producing unacceptable wavy lines. Accordingly, one aspect of the invention comprises a set of parallel electrodes which do not bend and which can be used to simultaneously erode a parallel set of lines for a grid system. Rotation of ninety degrees between a mold insert and the electrode permits erosion of a second set of grid system lines.

Tungsten is the electrode material of choice because of its very high melting point, high conductivity and relatively high strength as compared to copper or silver. However, tungsten is not practically available in a form from which electrodes can be made efficiently due, inter alia, to difficulties in machining. For this practical reason, electrodes for use in the invention are preferably formed from sintered copper-tungsten matrix containing about 30% copper.

A block of tungsten or of sintered copper-tungsten matrix is machined to provide a raised platform with a flat top. With the tungsten or sintered copper-tungsten matrix arranged as the grounded work piece, a commercially available electrical discharge machine may be used. Such machines pass a single wire electrode continuously between two spindles operated by independent microprocessors controlled servomotors. In repeated passages the wire electrode erodes material from the raised platform to form parallel raised electrodes on the block. In this way, each block electrode can, for example, be made 0.013 mm wide and 0.051 mm high and be spaced 0.33 mm from an adjacent block electrode so that a pattern of 0.33 mm square markings can be provided to define the grid system on a mold insert.

BRIEF DESCRIPTION OF THE DRAWINGS

Corresponding components are designated by the same reference numerals throughout the various figures.

DETAILED DESCRIPTION OF THE INVENTION

Figure 1:
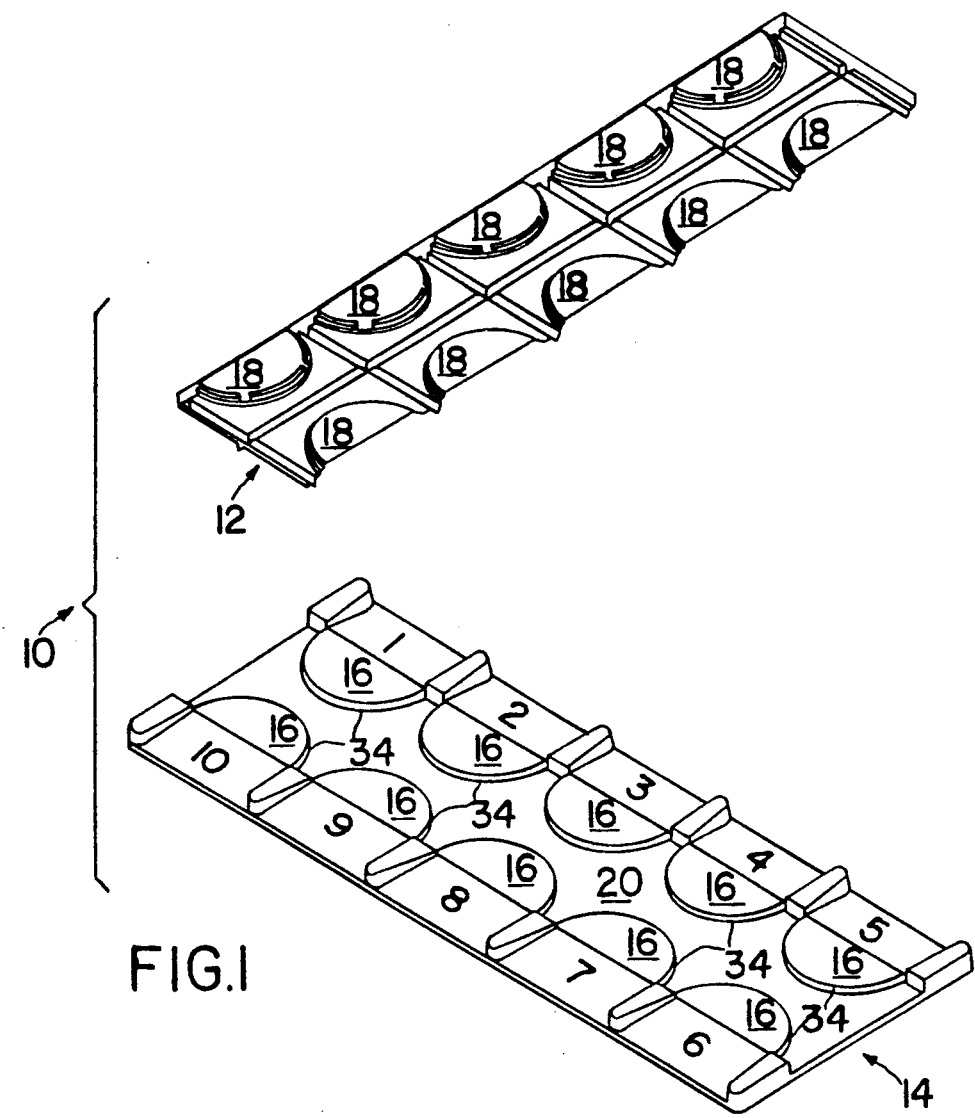
FIG. 1 is an exploded view of a plastic slide base and cover which, when assembled, has ten examination chambers.
Figure 2:
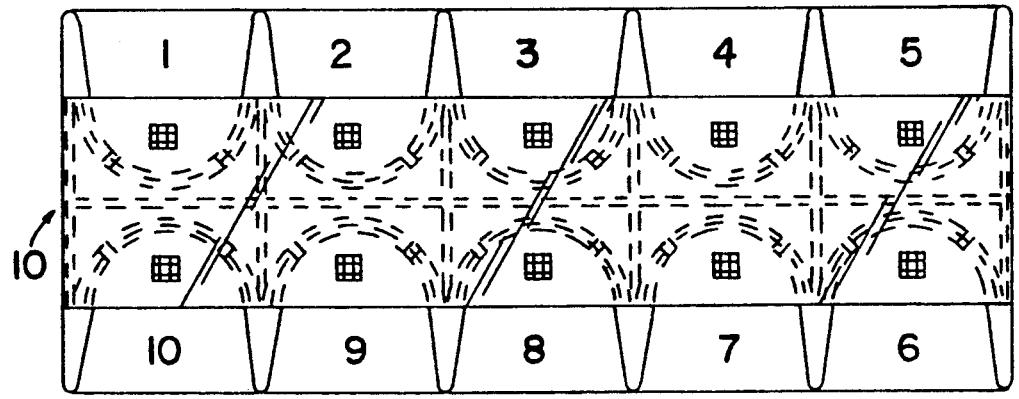
FIG. 2 is a top plan view of an assembled unitary slide with a grid system formed by use of mold inserts eroded by the method of the invention.

An exploded perspective view of a slide on which a grid can be formed using the method of the present invention is illustrated in FIG. 1 where the slide is generally designated by reference numeral 10. The slide 10 includes a plastic cover plate 12 and a plastic base plate 14. A top plan view of an assembled slide 10 is shown in FIG. 2. One form of this unitary type of slide is described in U.S. Pat. No. 4,637,693.

Figure 5:
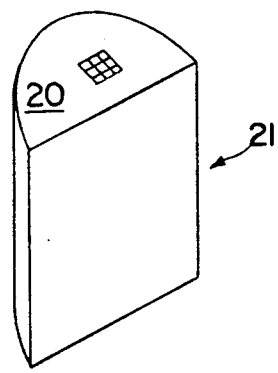
FIG. 5 is a perspective view of an optical quality mold insert on which a grid system of the invention has been eroded.

The plastic base plate 14 for the slide 10 includes flat, optically smooth examination chamber floor surfaces 16. The plastic cover plate 12 has examination chamber roof surfaces 18, which like the examination chamber floor surfaces 16, are flat and optically smooth. The mold inserts used to form the examination chamber roof surfaces 18 and floor surfaces 16 are preferably made of optical quality stainless steel or other metal and polished to mirror finishes. The desired grid pattern is provided by erosion of the polished mirror surfaces 20 (see FIG. 5) of the mold inserts 21 used to form the examination chamber floor surfaces 16. The erosion is accomplished by electrical discharge machining. An electrode to erode straight lines which are narrow and not excessively deep is used. Control of the depth of erosion is accomplished by adjustment of the applied voltage and current and of the distance maintained between the electrode and the polished surfaces 20. The width of the line is dependent on the applied voltage and current and also on the width of the electrode.

As the electrode is narrowed, its strength and resistance to bending are reduced. Accordingly, electrodes for use in this invention are made from a strong, high melting point, electrically conductive material.

Figure 4:
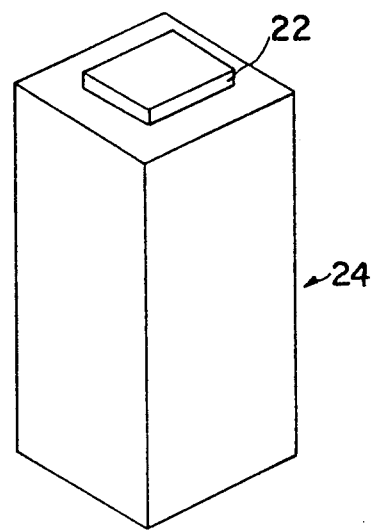
FIG. 4 is a perspective view of an electrode assembly block from which electrodes of the invention are made.
Figure 6:
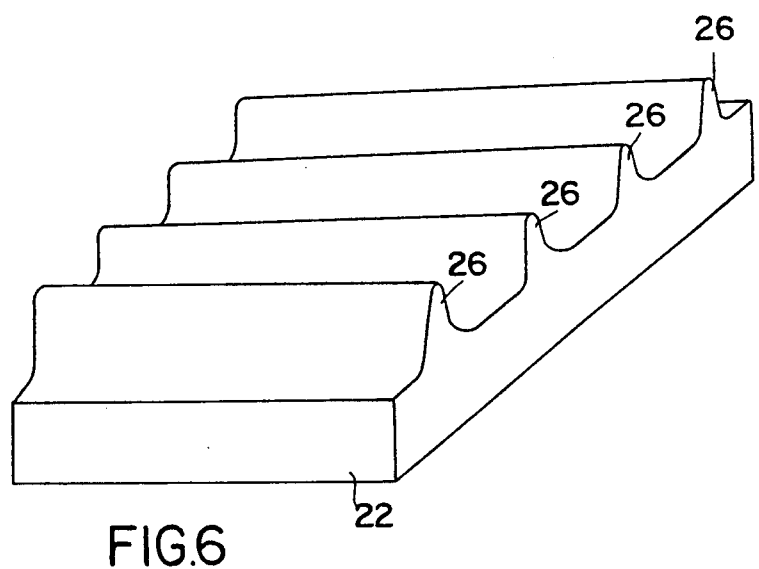
FIG. 6 is a perspective view of the raised platform on the electrode assembly block shown in FIG. 4 showing formed electrodes.

As shown in FIG. 4, an electrode assembly, generally designated as 24 is machined using known machine shop equipment such as grinders to provide at one end a raised pedestal 22 with a smooth flat surface on which a pattern of electrodes 26 is formed by wire electrical discharge machining. See FIG. 6. To form the electrodes 26, the electrode assembly 24 is immersed in deionized water and an electrical potential of 40 volts with a current of 0.4 amperes is supplied between a wire running parallel to the electrodes 26 to be formed on the surface of the electrode assembly 24.

The dimensions of the electrodes are chosen to provide pattern lines of desired dimension. For example, electrodes 0.013 mm wide by 0.051 mm high and approximately 1 mm long spaced 0.33 mm apart may be used to provide mold insert grid patterns appropriate for urinalysis slides.

Figure 3:
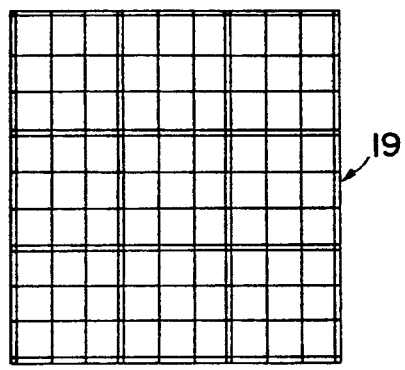
FIG. 3 is a top plan view of one kind of a grid system which can be formed on slides as shown in FIG. 2.

An electrode assembly 24 may be used to produce all of the lines in the grid pattern shown in FIG. 3 except the double paired lines. The double paired lines may, for example, be spaced 0.038 mm apart. Electrodes 26 cannot be formed on one electrode assembly 24 at such a narrow spacing because the wire electrical discharge machining uses a 0.102 mm diameter wire with a 0.025 mm spark gap around the wire which mandates a minimum spacing between electrodes 26 of 0.152 mm. To make the double paired lines, a second electrode assembly 24 is made with electrodes 26 for only the second line of each pair. The width, height and length of each electrode 26 on the second electrode assembly 24 may be the same as those of the electrodes 26 on the first electrode assembly 24.

Either electrode assembly 24 may be first used to form the grid pattern on the polished metal surface 20 of a mold insert 21. The mold insert bearing a polished metal surface 20 is mounted as the grounded part in a bath of non-conductive, high flash point oil. One of the electrode assemblies 24 is mounted above the mold insert to be lowered to the correct location to erode the desired pattern of lines on the polished metal surface 20. To erode the pattern of lines, a 50 volt and 0.2 ampere electrical signal is typically applied between the grounded polished metal surface 20 and the electrode assembly 24. This system permits erosion of lines 0.012 to 0.023 mm wide and 0.008 mm deep. Lines of different dimensions are similarly provided by appropriately dimensioned electrode assemblies.

The copper tungsten sintered material preferred in present practice for electrode conduction is formed by compressing fine particles of copper and tungsten at high pressure. The copper particles are quite visible at 30× magnification. It appears that the copper is melted out during the machining process with the consequent production of a substantial number of voids in the desired pattern lines. Missing or jagged spots appear along the top of each electrode "tooth". Such spots are generally from about 0.013 mm to 0.051 mm in width. The number of such voids vary because the copper-tungsten mixture is not homogeneous.

To eliminate such interruptions and gaps, the electrode assembly 24, after eroding a set of parallel lines, is slightly shifted laterally by, e.g., 0.1 mm with respect to the grounded polished metal surface 20 and again applied to erode the same lines. After the second use of the electrode assembly 24, the electrode assembly 24 is rotated ninety degrees with respect to the eroded parallel lines and a second set of perpendicular lines is eroded. This second set of lines is also eroded twice to assure elimination of interruption and gaps.

At this point, the electrode assembly 24 is changed and a second electrode assembly (not shown) is used for the final erosion of lines on the polished metal surface 20 following the same steps as were used with the first electrode assembly 24.

Upon completion of erosion of grid patterns on polished metal surfaces 20 for the necessary number of mold inserts 21 for a mold to make slide bases, the mold can be assembled and slides made using optical quality clear plastic. The resulting grid patterns on examination chamber floor surfaces 16 may have lines as narrow as 0.012 mm or about 15 microns wide. Such lines are distinct but not over-proportioned in comparison to, for example, red blood cells which are 5–10 microns in diameter. The height of the lines may only be only 0.008 mm to avoid the problem of particulate matter such as cells being strained out by the grid pattern when the liquid specimen is drawn into an examination chamber. The grid may be formed by ridges extending upwardly from the examination chamber floor, the height of said ridges being limited to substantially avoid straining by the grid pattern of objects from the liquid specimen.

The quality of the edges of the lines is another benefit. The edges of the lines of the grid pattern 19 made on the examination chamber floor surfaces 16 by the method of the present invention are sharp and distinct. These qualities aid in identification of objects on and adjacent the lines. In combination, the width, height and distinct edges of the lines sets out areas where, after a liquid specimen is injected in an examination chamber, particulate matter can settle so accurate count can be made. That particulate matter settling about a line will settle on one side or the other with a 50-50 probability because of the symmetric shape of the lines.

Although the invention has been specifically illustrated by an embodiment, various modifications and additions are encompassed by the invention as set out in the claims. For example, electrode assemblies can be made to erode patterns of lines on mold parts for making all types of optical components such as reticles and diffraction patterns. Essentially, any finely lined pattern that needs to be made can be by the process of the present invention.

I claim:

1. A transparent plastic slide having a plurality of chambers for microscopic examination of a sample of a human biological fluid each of said chambers having a flat, optically smooth floor at least one of said floors of said chambers having a grid pattern to facilitate accurate counting at a magnification of about 400 times of particles present in said sample said grid pattern comprising a plurality of markings defining approximately 0.33 mm squares said grid pattern markings consisting of raised symmetrical lines having a width of from about 0.005 to about 0.05 mm said lines extending upwardly from at least one of said floors said magnification being accomplished by an instrument which provides a field of view having a diameter of about 0.33 mm at a magnification of 400 times.

2. A transparent plastic slide having a plurality of chambers for microscopic examination of a sample of a human biological fluid such as urine, blood or spinal fluid each of said chambers having a flat optically smooth floor at least one of said chamber floors having a grid pattern to facilitate accurate counting, at a magnification of from about 10 times to about 1500 times of particles present in said biological fluid sample said grid pattern comprising a plurality of markings defining areas on said floor surface said grid pattern markings consisting essentially of symmetrical lines having a width of from about 0.005 mm to about 0.05 mm said lines extending upwardly from said at least one chamber floor each of said areas defined by said grid pattern markings being of a size that substantially corresponds to the field of view, at the selected magnification of about 10 times to about 1500 times, of the magnification instrument to be utilized.

3. A transparent plastic slide as defined by claim 2 in which the height of said lines extending upwardly from said at least one chamber floor is limited to substantially avoid straining by said lines of particles contained in said sample.

4. A transparent plastic slide as defined by claim 2 or 3 in which said lines extending upwardly from said at least one chamber floor are sharply defined and substantially free of interruptions.

* * * * *